United States Patent Office

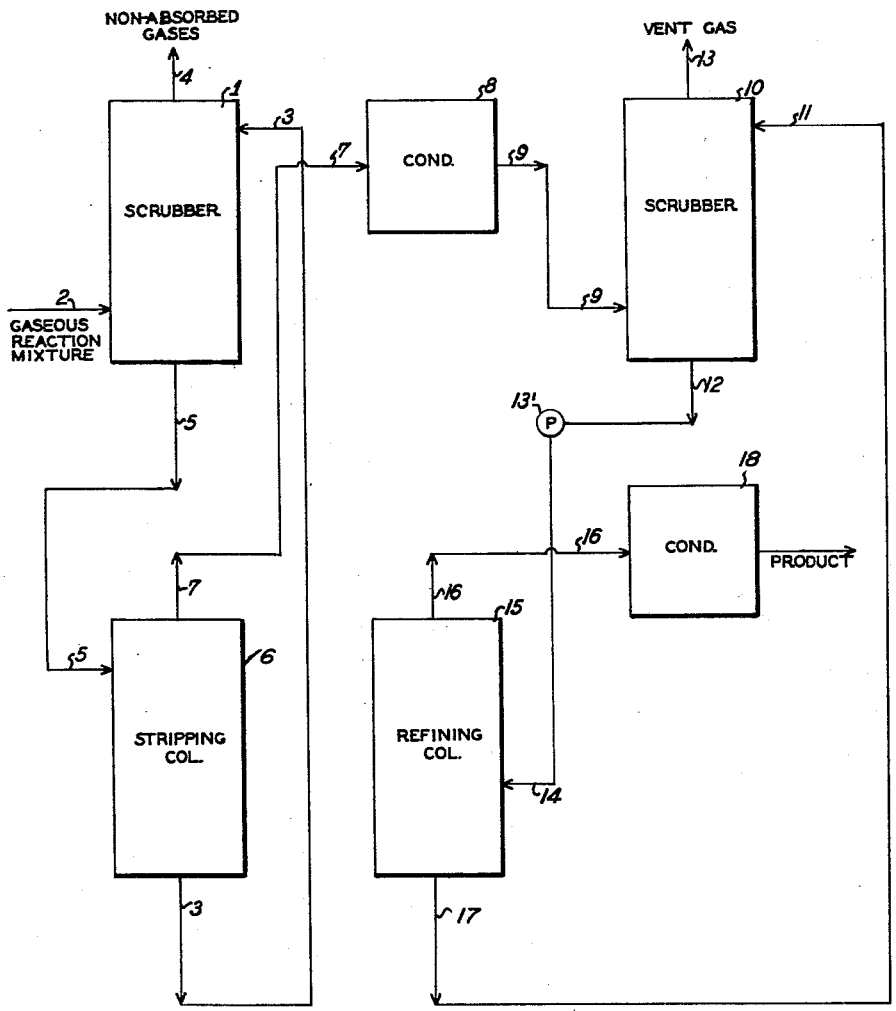

3,174,262
Patented Mar. 23, 1965

3,174,262
CHEMICAL PROCESS AND APPARATUS FOR
RECOVERY OF ETHYLENE OXIDE
John H. Lutz, Wyckoff, N.J., assignor to Halcon International, Inc., a corporation of Delaware
Filed Sept. 30, 1960, Ser. No. 59,563
5 Claims. (Cl. 55—48)

This invention relates to an improved process and apparatus for the recovery of ethylene oxide from mixtures thereof which also contain carbon dioxide and other gaseous inerts.

The invention is particularly concerned with a process whereby a dilute aqueous mixture containing ethylene oxide is first stripped to separate ethylene oxide, carbon dioxide, and gaseous inerts from liquid aqueous bottoms and the ethylene oxide fraction is then reabsorbed in water thereby to separate the ethylene oxide from carbon dioxide and gaseous inerts. Subsequently, the reabsorbed ethylene oxide is rectified in order to produce substantially pure ethylene oxide.

Mixtures containing dilute concentrations of ethylene oxide are obtained by the oxidation of ethylene, usually over a silver catalyst. It has been customary in the art to treat these dilute reaction mixtures with water in order to absorb the ethylene oxide. Various procedures have been employed to work up the ethylene oxide from this absorbate in order to obtain product ethylene oxide in high purity. The various techniques previously employed for working up the dilute solutions of ethylene oxide have generally involved elaborate and costly apparatus and process features.

The art has been faced with the problem of recovering ethylene oxide efficiently while minimizing the capital equipment cost and process operation costs.

It is an object of this invention to provide an improved process for the recovery of ethylene oxide from dilute mixtures such as are produced by the catalytic oxidation of ethylene.

It is a further object of the present invention to provide an improved apparatus for carrying out the present inventive process.

In accordance with the present invention, dilute ethylene oxide mixtures such as are obtained from the catalytic oxidation of ethylene are scrubbed with water thereby to separate the ethylene oxide from unreacted ethylene, oxygen, and other gaseous components of the reaction mixture. The thusly separated gaseous materials are suitably recycled to the catalytic oxidation step. The aqueous absorbate which contains ethylene oxide in dilute concentration together with dissolved carbon dioxide and gaseous inerts in stripped in order to separate a gaseous overhead fraction comprising a predominance of the ethylene oxide together with carbon dioxide and gaseous inerts from a liquid aqueous bottoms fraction. This liquid aqueous bottoms fraction is appropriately recycled to the previous absorption step and used to absorb ethylene oxide from the catalytic oxidation reaction mixture. The gaseous overhead from the stripping operation is cooled in order to condense ethylene oxide and water contained therein. The cooled mixture is then contacted with water in order to reabsorb the ethylene oxide. A predominance of the carbon dioxide and gaseous inerts is not reabsorbed in the water and is readily separated as a gaseous stream from this reabsorption operation. A liquid aqueous solution of ethylene oxide free of most of the carbon dioxide and gaseous inerts is obtained as the liquid product. The aqueous ethylene oxide stream is then rectified in order to separate substantially pure ethylene oxide from materials boiling higher and lower than the ethylene oxide.

Through practice of the invention as above described, high yields of high purity ethylene oxide are readily and economically obtained. The process is practiced with a minimum of process costs and a minimum of capital equipment investment.

The accompanying drawing illustrates in diagrammatic form an embodiment of the present invention.

Referring to the drawing, a gaseous reaction mixture such as is formed by the catalytic oxidation of ethylene to ethylene oxide is introduced into scrubber 1 through line 2. Suitably this gaseous mixture comprises 0.1–4% ethylene oxide, 0–20% ethylene, 0–10% oxygen, 0.1–15% carbon dioxide, and the rest inerts. The mixture is generally at a temperature of 75–300° C. and a pressure of 200 to 600 p.s.i.a. An aqueous stream in amount of about 0.5–5 times the weight of the reaction mixture is introduced into the scrubber through line 3. In the scrubber, ethylene oxide together with small amounts of carbon dioxide and gaseous inerts is absorbed in the aqueous phase. Non-absorbed gases usually comprising nitrogen, oxygen, carbon dioxide and unreacted ethylene are removed from the scrubber through line 4 and can appropriately be recycled to the catalytic oxidation. The liquid aqueous fraction at about 20–60° C. and containing absorbed ethylene oxide together with carbon dioxide and gaseous inerts is removed from the scrubber through line 5. This liquid mixture illustratively contains of the order of about 0.1–4% ethylene oxide. The liquid aqueous mixture is preheated to about 90–150° C. (not shown) and introduced into stripping column 6 wherein ethylene oxide together with carbon dioxide and the other inerts are stripped from the aqueous absorbing liquid. Steam can be introduced into the stripping column to facilitate the stripping. Alternatively, heating coils can be provided at the base of the tower thereby to volatilize water and other materials in the column and provide stripping. A liquid bottoms stream containing predominantly water with very small amounts of ethylene oxide is removed from the stripping column and recycled to scrubber 1 by means of line 3 after appropriate cooling which is not shown.

The gaseous overhead fraction at about 90–110° C. is passed from stripper 6 by means of line 7 to condenser 8. In the condenser the temperature of the gaseous stream is lowered in order to effect condensation of ethylene oxide and water in the gaseous fraction. Suitably, the temperature is lowered to about 60 to 120° F. The cooled stream containing liquid and vapor is then passed from condenser 8 through line 9 to scrubber 10. In the scrubber, the cooled mixture is contacted with an aqueous stream in amount of about 0.5–5 times the weight of said mixture which is introduced into scrubber 10 by means of line 11. The temperature of the aqueous stream is suitably about 20–60° C. The ethylene oxide is absorbed and passed from the scrubber 10 in dilute aqueous solution through line 12. Most of the carbon dioxide and gaseous inerts are not absorbed in the aqueous stream and are removed as vent gas from the scrubber 10 through line 13. This vent gas can be discarded. The liquid ethylene oxide solution which typically contains about 2–15% ethylene oxide is passed by line 12 into pump 13' wherein it is compressed and pumped through line 14 into refining column 15. In the refining column, the aqueous stream is fractionally distilled to separate a high purity ethylene oxide fraction overhead through line 16. Aqueous bottoms are removed through line 17 and are suitably recycled to scrubber 10 through line 11.

The overhead from rectification column 15 is condensed in condenser 18 and comprises high purity ethylene oxide product. If desired, this product can be further rectified in order to increase the purity to better than 99.5%.

The following example illustrates the invention:

*Example*

Referring to the drawing, as gas feed mixture resulting from catalytic oxidation of ethylene and comprising ethylene oxide, carbon dioxide, nitrogen and other inerts, and unconverted ethylene, is introduced into feed inlet 2 of scrubber 1. Ethylene oxide, carbon dioxide and gaseous inerts are absorbed in the aqueous solvent which is introduced through line 3. The liquid effluent comprising ethylene oxide (about 1%), carbon dioxide, and inerts is removed through line 5 and passed to stripper 6. The gaseous effluent containing unreacted ethylene leaves the scrubber through line 4; this effluent is suitably recycled to the catalytic oxidation step.

The liquid effluent from scrubber 1 is introduced into the stripping column 6 at the top through line 5. The lower part of the stripping column is suitably heated by means of live steam or steam coils (not shown) under such conditions as to remove the ethylene oxide dissolved in the water and to form a column overhead fraction comprising ethylene oxide, carbon dioxide, and inerts. The stripping column pressure is suitably 20 p.s.i.a. and the overhead temperature is about 100° C. The aqueous bottoms from the stripping column free of substantial amounts of ethylene oxide is withdrawn through line 3 and recycled to scrubber 1 as absorbent solvent.

The gaseous effluent passes from the stripping column through line 7 and is cooled in condenser 8 to about 35° C. whereby most of the water and ethylene oxide contained therein is condensed.

The cooled mixture passes through line 9 to scrubber 10 wherein it is contacted with about twice its weight of an aqueous stream introduced through line 11. The aqueous stream is suitably at about 35° C. Scrubber pressure is about 17 p.s.i.a. In the scrubber, ethylene oxide is separated from carbon dioxide and gaseous inerts which are not absorbed in the scrubber water. The carbon dioxide and inerts pass from the scrubber as vent gas through line 13 and are discarded. The liquid effluent containing ethylene oxide (about 10%) passes from the scrubber through line 12.

The liquid effluent is compressed by means of compressor pump 13 and passed to refining column 15 which is equipped with suitable heating means such as steam coil (not shown). The refining column rectifies the aqueous ethylene oxide feed producing an ethylene oxide overhead which leaves the column through line 16 at about 60 p.s.i.a. and about 52° C. This effluent is condensed in condenser 18 to produce high purity ethylene oxide product (99+%).

Uncondensed vapors comprising ethylene oxide and inerts can be recycled to scrubber 10 (not shown). If desired, the liquid ethylene oxide product can be further distilled to produce a product of 99.5+% purity (not shown).

The aqueous liquid from column 15 is suitably cooled (not shown) and recycled through lines 17 and line 11 to scrubber 10 for use in absorbing additional ethylene oxide.

What is claimed is:

1. A process for the purification of an ethylene oxide containing solution which comprises: introducing said aqueous solution containing ethylene oxide, carbon dioxide and gaseous inerts into a stripping zone maintained at a pressure above atmospheric and at a temperature in the range of 90 to 150° C.; removing a gaseous stream containing ethylene oxide, carbon dioxide and inerts from said zone; cooling said gaseous stream in a condensing zone; passing the effluent from said condensing zone to a scrubbing zone maintained at a pressure less than said stripping zone; contacting said effluent countercurrently with an aqueous liquid hereinafter described in said scrubbing zone; passing a liquid effluent containing ethylene oxide from said scrubbing zone to a rectification zone; withdrawing a high purity ethylene oxide distillate and an aqueous liquid from said rectification zone, and recycling at least a portion of said aqueous liquid to said scrubbing zone.

2. The process of claim 1 wherein said solution is an effluent from a scrubber wherein a gaseous reaction mixture from ethylene oxidation is contacted with a liquid stream obtained from said stripping zone.

3. The process of claim 1 wherein said scrubbing zone is maintained above atmospheric temperature.

4. The process of claim 1 wherein said rectification zone is maintained at an overhead temperature of about 52° C. and an overhead pressure about 60 p.s.i.a.

5. An apparatus for the production of ethylene oxide from a gaseous mixture containing ethylene oxide, gaseous inerts, carbon dioxide, ethylene and oxygen which comprises: a first scrubbing means, a stripping means, a condensing means, a second scrubbing means and a rectifying means, wherein means are provided: to pass material from each of said zones to the next following zone, to pass liquid from the bottom of said stripping means to the top of said first scrubbing means, and to pass liquid from the bottom of said rectifying means to the top of said scrubbing means; said rectifying means being provided with means for withdrawing gaseous ethylene oxide therefrom; and means for maintaining the pressure in said second scrubbing means less than the pressure in said stripping means.

References Cited in the file of this patent

UNITED STATES PATENTS

| | | |
|---|---|---|
| 2,169,210 | Balcar | Aug. 15, 1939 |
| 2,771,473 | Courter | Nov. 20, 1956 |
| 2,806,552 | Koble | Sept. 17, 1957 |
| 2,814,359 | Koble | Nov. 26, 1957 |
| 2,815,827 | Jezl et al. | Dec. 10, 1957 |